Figure 1:
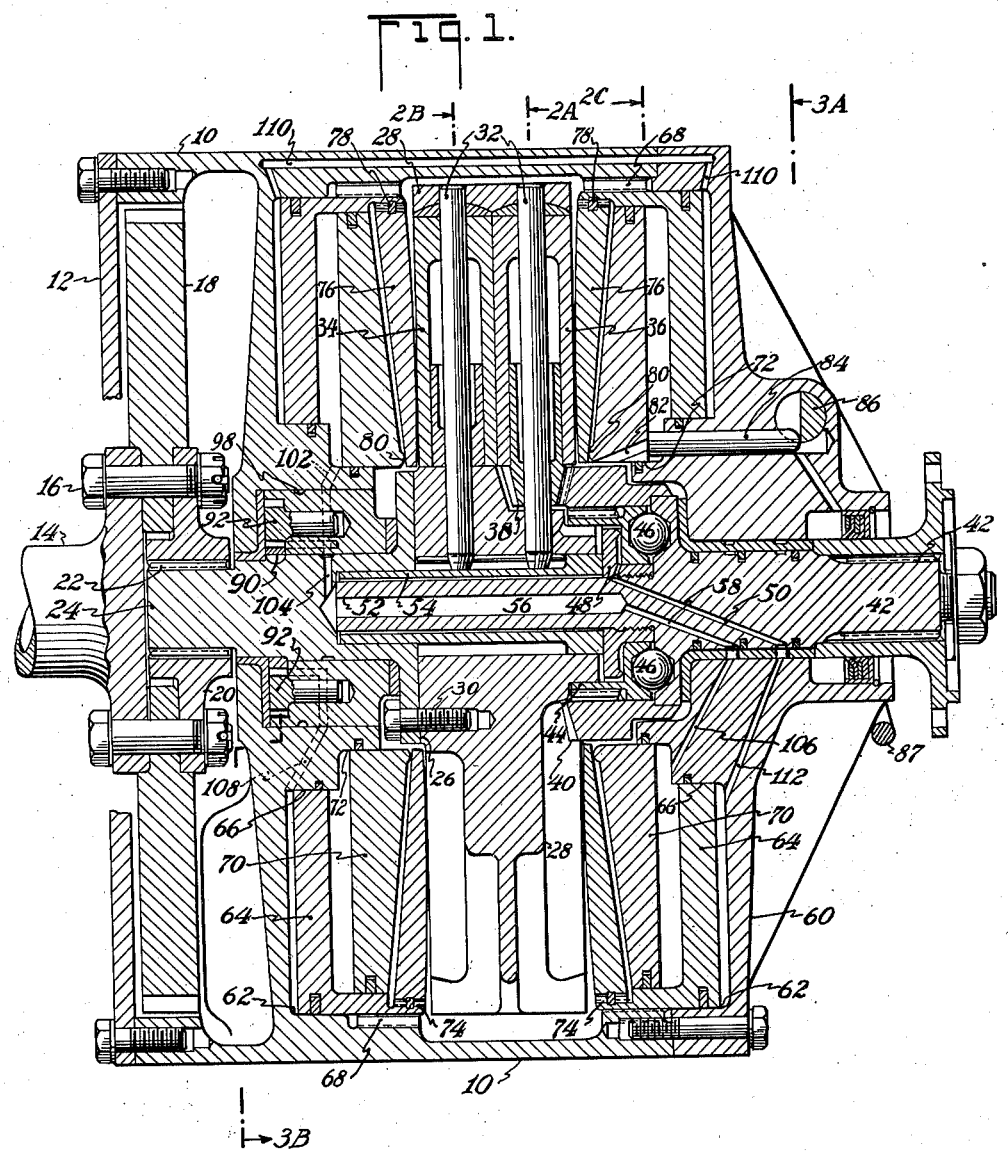

May 19, 1936.   R. CHILTON   2,041,284
TRANSMISSION
Filed Sept. 17, 1935   3 Sheets-Sheet 1

INVENTOR.
ROLAND CHILTON
BY
ATTORNEY.

May 19, 1936.  R. CHILTON  2,041,284
TRANSMISSION
Filed Sept. 17, 1935  3 Sheets-Sheet 2
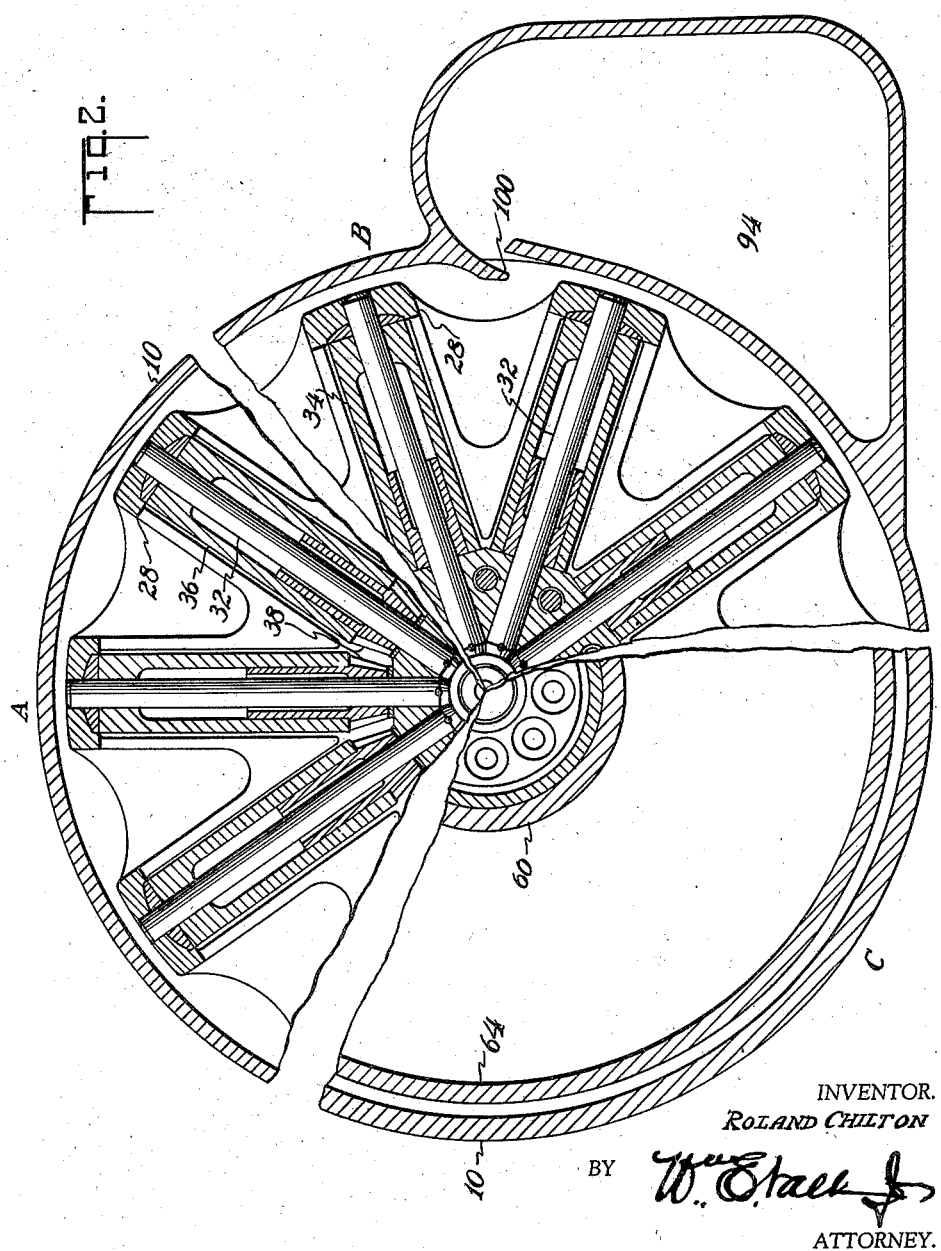
INVENTOR.
ROLAND CHILTON
BY
ATTORNEY.

May 19, 1936.　　　R. CHILTON　　　2,041,284
TRANSMISSION
Filed Sept. 17, 1935　　　3 Sheets-Sheet 3
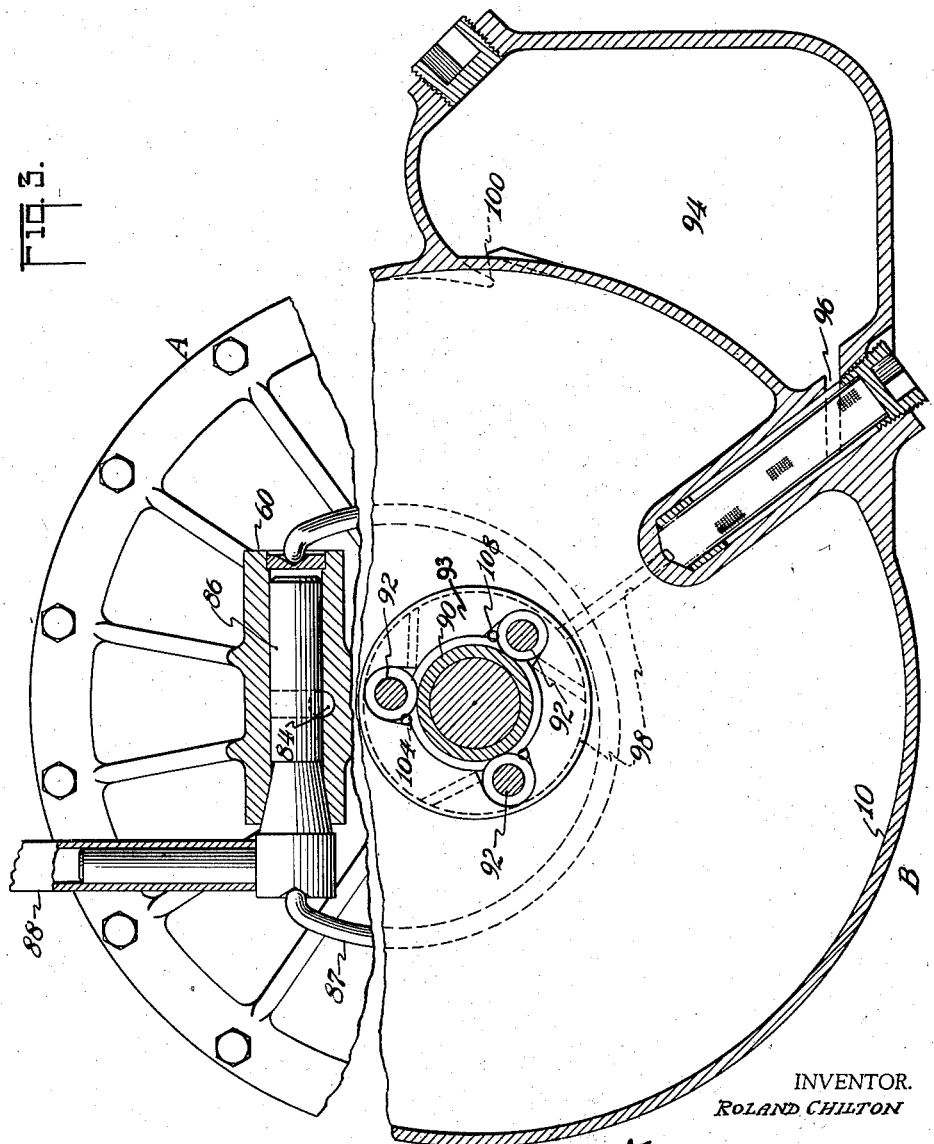
INVENTOR.
ROLAND CHILTON
BY
ATTORNEY.

Patented May 19, 1936

2,041,284

UNITED STATES PATENT OFFICE 2,041,284

TRANSMISSION

Roland Chilton, Ridgewood, N. J.

Application September 17, 1935, Serial No. 40,920

11 Claims. (Cl. 74—281)

This invention relates to variable speed transmissions, and in certain aspects comprises improvements in my co-pending series of applications which include Serial Numbers 669,144; 723,889; 728,058; 742,751; 742,752; 743,515; 746,958 and 759,349.

This series of applications is based on radially elongate planetary rollers engaged by members subtending fixed and variable pitch cone angles of roller driving contact; the variable contact being obtained by rocking action. The practical utilization of this new progressively variable speed organization requires the solution of a large number of mechanical problems in order to obtain efficient operation, while the broad principle of the invention may be carried out in a great variety of embodiments each requiring the development of new structure.

A prime object of the present invention is to select from the large number of alternative available component organizations, those which will afford a maximum of simplicity and compactness so that high capacity may be realized with a minimum of bulk, weight and cost.

In the transmission of this invention the rocking contact shift is effected by elastic distortion of a proximately flat annular disc, and a further object of the invention is to provide improved and simplified means for controlling this distortion; and for contact-loading the disc in proportion to the driving effort devolving upon the contact, despite the fact that under light loads, the pressure required to distort the disc may exceed the desired contact pressure.

Other objects of the invention will be obvious from, or pointed out in the following description with reference to the drawings, in which:

Fig. 1 is a longitudinal axial section through the transmission;

Fig. 2 comprises transverse fragmentary sections in which segment A is on the line 2a of Fig. 1; segment B is on the line of 2b of Fig. 1, and segment C is on the line 2c of Fig. 1; and Fig. 3 comprises two fragmentary transverse sections of which the upper section is on the line 3a of Fig. 1, and the lower section is on the line 3b of Fig. 1.

Referring first to Fig. 1, a main housing 10 is secured to a conventional back plate 12 of an engine having a conventional crankshaft 14 to which is secured, as by bolts 16, the usual flywheel 18. The bolts 16 also serve to secure a driving flange 20, into which is splined at 22, a driving shaft 24, which is flanged at 26 for securement to a cage 28 by bolts 30. Rotatably mounted on spindles 32 in the cage 28 are a plurality of rollers 34 and 36 arranged in paired contact as shown, the rollers 36 being equipped with bevel pinions 38 which in turn mesh with a driven bevel gear 40. This bevel gear drives a driven shaft 42, through a driving member 44, by means of balls 46, which are engaged in inclined pockets formed in the member 44 and the shaft 42 as shown. The driving member 44 is limited to very slight axial movement upon the shaft 42, by means of a valve seat member 48, the under side of which is in communication with a hole 50 in the shaft 42. This shaft 42 has an extension or pilot 52 which engages a bushing 54 on which the cage 28 is free to rotate, and the extension 52 is provided with a bore 56 communicating with a hole 58.

The housing 10 is provided with a rear housing cover 60 and cylindrical bores 62 are formed both in the cover 60 and in the housing 10 to provide cylinders for annular pistons 64, the inner peripheries of which are fitted to the housing 10 and cover 60 at 66. These pistons are further splined into the housing 10 and cover 60 at 68. Within the pistons 64 are bores in which axially slidable pistons 70 are fitted, these also fitting on the housing and cover at 72. Splined into the outer pistons 64 at 74 are distortable crowned face annular discs 76 which rockably contact the rollers 34—36 as shown. The splines 74 are grooved for insertion of locking rings 78 whereby the outer peripheries of the discs are constrained to axial movement with the outer pistons 64. The inner peripheries of the discs 76 are contacted by annular projections 80 on the inner pistons 70. A vent or relief hole 82 is provided in the right hand inner piston 70, and with this hole there cooperates the control plunger 84, engaged with one corner of a diametral flat formed in a control shaft 86, held in position by a snap ring 87, the shaft having a control lever 88 (Fig. 3), these latter elements being carried by the housing cover 60.

The driving shaft 24 rigidly carries a main pump gear 90, with which are meshed a plurality of pump pinions 92 (see also Fig. 3) mounted in a boss 93 fixed in the housing 10. An oil sump 94 is provided alongside the transmission, and to this sump the suction sides of the three pumps 92 are connected by way of a filter 96 and suitable passages 98. The sump is provided with a high level catchment slot 100 whereby oil in the housing 10 is continuously bailed out into the sump by the rotation of the cage 28, this oil having bled from the pistons and serving as lubricant for the mechanism as a whole. This self-bailing feature avoids the necessity for a scavenging pump to remove oil from the housing 10, avoids the collection of considerable oil in the housing, and avoids foaming tendencies in the rapid circulation of the lubricant.

The delivery side of one of the pumps comprised by the pinions 92 is connected to both of the inner or plate-distorting pistons 70 by means of drilling indicated at 102 for the left hand piston, and by drilling at 104 in the shaft 24 which communicates with the bore 56 of the shaft 42, and via the hole 58 in that shaft, to a hole 106 in the rear cover 60, to the right hand piston 70.

Another one of the pumps formed by the pinions 92 is connected, as by a hole indicated at 108, to the left hand outer contact loading piston 64, which is in turn coupled to the right hand loading piston 64 by passages 110. By means of a hole 112 in the rear cover 60 the hydraulic system of the outer or contact loading pistons 64, is connected to the hole 50 in the driven shaft 42 whereby this hydraulic system is always in communication with the torque-loaded relief valve 48. The operation of the device is as follows:

The position of the inner or plate-distorting pistons 70 is controlled by the position of the valve 84, as determined by the setting of the control shaft 86, by the lever 88. It has been seen that one of the pumps including pinions 92 is continuously delivering to the pistons 70, and it should be clear that if the right hand piston should initiate movement away from the valve 84, the opening at the relief hole 82 will be immediately increased, thus relieving the hydraulic pressure and arresting the incipient movement. Thus, the location of the right hand piston 70 will be almost touching the valve 84, and this piston will accordingly respond to any movement of this valve, which it can never actually touch, however, because some small opening is required at 82 to pass the oil quantity delivered by the pump. It is emphasized that this is a volume, or displacement control which is effective to accurately locate the pistons 70, and so to control the degree of distortion of the discs 76, and hence the radius of contact of the crowned faces of these discs with the rollers 34—36, which contact will be moved outwardly by retracting the control plunger 84 to the right, the outward movement of the contact continuing as long as the piston movement is followed up by the control valve 84, and ceasing immediately the plunger 84 is held in any fixed position. This action is quite independent of the force required to distort the disc or of the contact load present on the disc. The hydraulic pressure on the disc-distorting pistons 70 will increase as these forces increase, but without affecting the contact pressures which are independently controlled by the outer piston 64 as will shortly be described. It should be noted that as the two discs 76 have identical elastic properties, and as the pistons 70 are connected together hydraulically to be at any instant subject to the same hydraulic pressure, the rocked position of contacts will be identical for each disc.

The outer or contact-loading pistons 64 have already been described as hydraulically connected together, to one of the pumps including a pinion 92, and to the torque-responsive pressure regulating means comprised by the valve member 48, the drive member 44, and the balls 46. These balls cooperate with their inclined pockets to force the member 44 against the seat member 48 with a pressure which is always proportional to the instantaneous torque or driving effort on the driven shaft 42. Accordingly, this torque-responsive device comprises a relief valve for the hydraulic system of the outer pistons 64, whereby the pressure on the pistons 64 is always proportional to the torque on the driven shaft 42. It should be emphasized that the pistons 64 and associated pressure control comprise means for controlling the contact load of the discs 76 against the rollers, and that the rocked position of said discs will not affect the pressure on the pistons 64, only affecting their position. On the other hand, the rocking of the disc for speed ratio changes is effected by the pressure between the pistons 70 and 64, as controlled by the valve 84 and lever 88, without reference to the above mentioned means for governing the contact load. The contact load is governed automatically in response to torque, while the speed ratio is selectively controlled; the bleeding of fluid from either piston 70 or 64 will always be controlled by the adjusted position of the lever 88, and by the torque, respectively.

The ratio changing action in this type of transmission has been reiterated in some dozen co-pending applications, and need not be repeated here in detail. Briefly, when the contact of the rollers with the rotationally fixed disc 76 falls on the pitch cone line of the bevel pinion 38 and the driven bevel gear 40, this gear is also held rotationally fixed giving one to zero ratio. The driven shaft 40 is progressively accelerated from rest as the rocking distortion of the crowned face reaction discs 76 transfers the contact outwardly along the rollers, reducing the pitch cone angle subtended by this contact. When this angle becomes one-half that of the bevel gear 40 the transmission will be in 1 to 1 ratio, whereat the driven shaft rotates at equal speed to the driving shaft 24, but (in this particular embodiment) in the opposite direction. Contact movement inwards beyond the 1 to 0 ratio position (shown) affords driving ratios in the opposite direction of driven shaft rotation.

It is a property of transmissions having a fixed reaction member that the torque thereon is the sum of the torques on the driving and driven members when these rotate in opposite directions. In 1 to 0 ratio there is zero torque on the driving member, wherefore the torque on the reaction member is then equal to the torque on the driven shaft. In 1 to 1 ratio of reverse rotation the torques on the driving and driven shafts are equal, wherefore the torque on the reaction member is twice that of the driven member, a ratio of 2 to 1 over the previous condition. It is an important provision that the radii of contacts on the reaction discs 76 vary in precisely this proportion in those embodiments where the variable contact member is the reaction member.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, in combination, an annular disc to be distorted, hydraulic cylinder and piston means respectively engaging peripheries of said disc, a manually operable valve to control the volume of hydraulic fluid in said means, a housing cylinder cooperating with said means, and a torque-responsive device regulating the hydraulic pressure in said housing cylinder.

2. In a transmission, a roller and a distortable annular disc contacted therewith, an hydraulic piston and cylinder unit engaging peripheries of said disc to control the distortion thereof, and an hydraulic cylinder housing said unit and adapted to load said contact therethrough.

3. In a transmission, a roller and a distortable annular disc contacted therewith, an hydraulic piston and cylinder unit engaging peripheries of said disc to control the distortion thereof, an hydraulic cylinder housing said unit and adapted to load said contact therethrough, and means to independently control the distorting and the loading hydraulic pressures.

4. In a transmission, a roller and a distortable annular disc contacted therewith, an hydraulic piston and cylinder unit engaging peripheries of said disc to control the distortion thereof, an hydraulic cylinder housing said unit and adapted to load said contact therethrough, an operator's control means for said distorting unit, and a torque-responsive control means for said housing cylinder.

5. In a transmission, in combination, a planetary roller and an annular disc to be contact-loaded and distortably rocked thereon, annular pistons engaging respective peripheries of said disc, said pistons constituting an hydraulic disc-distorting unit, and means to contact load said unit and disc comprising an hydraulic housing cylinder for said unit.

6. In a transmission, in combination, a planetary roller and an annular disc to be contact loaded and distortably rocked thereon, annular pistons engaging respective peripheries of the disc, said pistons constituting an hydraulic disc-distorting unit, means to contact-load said unit and disc comprising an hydraulic housing cylinder for said unit, means to control the volume of hydraulic fluid between said pistons, and means to control the pressure of hydraulic fluid in said housing cylinder.

7. In a transmission, in combination, a housing cylinder, a first piston therein, a second piston within the first said piston, a disc having inner and outer peripheries engaged by respective pistons, a planetary roller rockably contactable by said disc, means to control the hydraulic volume between pistons, and means to control the hydraulic pressure in the housing cylinder.

8. In a transmission, substantially radial rollers, an annular disc contacting said rollers rockable to control the point of contact of said disc and rollers, a piston having a bore, a second piston slidable within said bore and operable by changes of volume of fluid within said bore to rock said disc, volume control means for said fluid, a cylinder within which said first piston is slidably fitted, said cylinder having fluid under pressure therein, and means for controlling the fluid pressure in said cylinder, said pistons engaging respective peripheries of the disc.

9. In a transmission, in combination, a roller, an annular disc distortable for ratio changing roller contact shift, a fixed cylinder, a first piston therein engaging one periphery of said disc, a second piston within the first said piston engaging the other periphery of said disc, the relative position of said pistons controlling the distortion of said disc while pressure on the first said piston controls the contact load, and hydraulic means for controlling said relation and said pressure.

10. In a transmission, a housing cylinder, a roller, a disc to be contact-loaded against said roller and distortable for contact shift thereon, and means to effect said loading and distortion comprising pistons engaging respective peripheries of said disc and arranged in tandem between said housing and said disc.

11. In a variable speed transmission, a piston having a bore, a second piston slidable within said bore and adapted to confine a fluid therein, manually controlled means for varying the fluid volume, a cylinder within which said first piston is slidable adapted to contain fluid under pressure, means responsive to the load on said transmission for controlling said pressure, and an annular disc rockable to change the transmission ratio and engaged with said pistons for rocking thereby.

ROLAND CHILTON.